June 3, 1958　　　E. C. WHITEHEAD　　　2,837,055
TISSUE-HOLDER RECEPTACLES
Filed Dec. 9, 1954　　　2 Sheets-Sheet 1
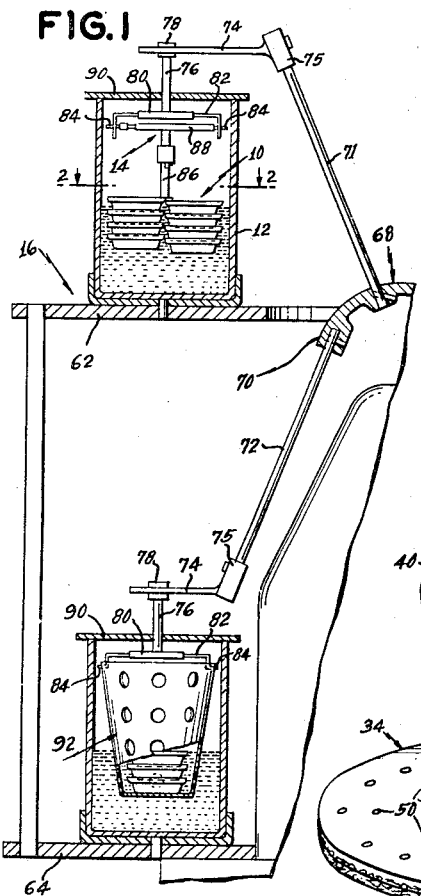
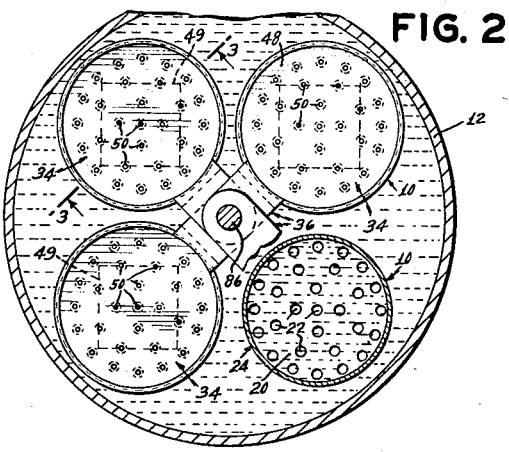
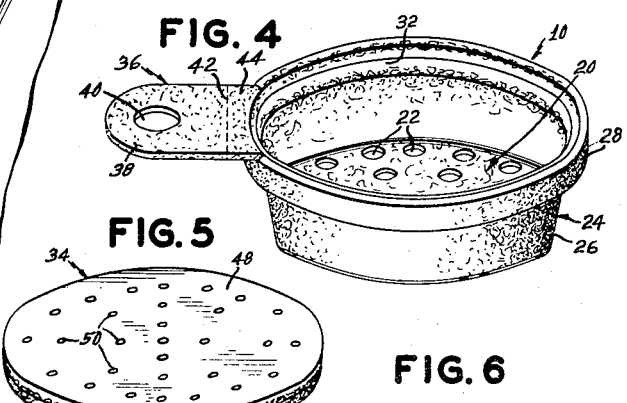
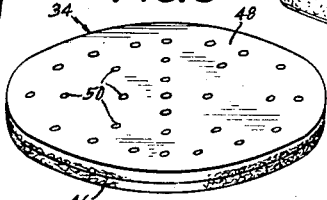
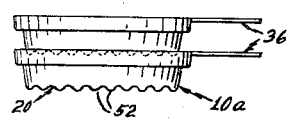
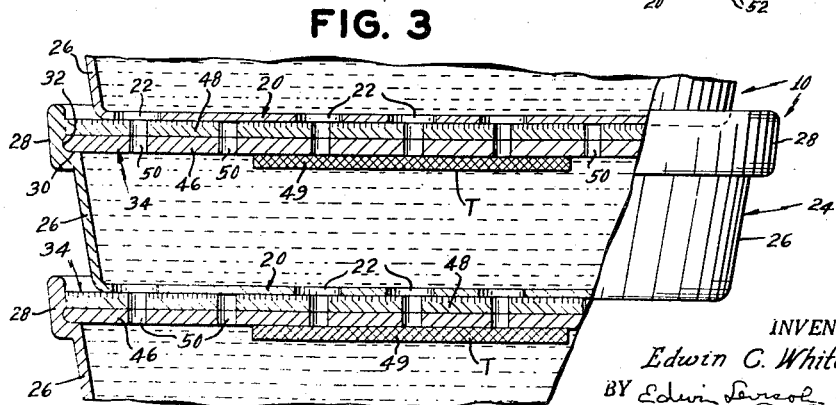
INVENTOR.
Edwin C. Whitehead
BY
ATTORNEYS June 3, 1958 E. C. WHITEHEAD 2,837,055
TISSUE-HOLDER RECEPTACLES Filed Dec. 9, 1954 2 Sheets-Sheet 2

INVENTOR.
Edwin C. Whitehead
BY
ATTORNEYS

United States Patent Office

2,837,055
Patented June 3, 1958

2,837,055

TISSUE-HOLDER RECEPTACLES

Edwin C. Whitehead, Crestwood, N. Y., assignor to Technicon International, Ltd., New York, N. Y., a corporation of New York Application December 9, 1954, Serial No. 474,244

5 Claims. (Cl. 118—500)

This invention relates to the preparation of human or animal tissue for microscopic examination and more particularly to containers or holders which are employed for holding the tissue specimens during their immersion in the various liquids, i. e., fixatives, dehydrants, infiltrating agents, clearing agents, etc., used in the preparation of the tissue.

Tissue processing apparatus of the type which may be used to advantage for immersing tissue in the various liquids is shown, for example, in Patents Nos. 2,341,197 and 2,341,198, granted to Edwin C. Weiskopf, United States Letters Patent No. 2,583,379, granted to Nelson G. Kling, and in United States patent application Serial No. 358,812 filed June 1, 1953, now Patent 2,741,221, by Edwin C. Weiskopf and Andres Ferrari Jr. The aforesaid patents and patent application are owned by the assignee of the present application. In the operation of such apparatus the tissue holders are moved automatically into and out of each of a plurality of liquid-containing receptacles, in succession, with intervening intervals during which said holders are positioned within the receptacles respectively for subjecting the tissue or other material to the action of the various liquids provided in said receptacles, i. e. fixatives, dehydrants, clearing agents, infiltrating agents, etc.

One object of the invention is to prevent the curling or other distortion of tissue, for example intestines or other tubes or any other tissue specimens of thin wall section which is likely to curl up or become distorted by the fixative or other tissue processing liquids. In this connection it will be understood that if the tissue is allowed to curl or become distorted, it is difficult or impossible to cut a true representative section from the paraffin block in which the tissue is embedded. The object just stated is to eliminate this serious difficulty and disadvantage.

Another object is the provision of a tissue holder receptacle which enables the tissue specimen to be disposed in optimum condition for treatment by the various processing liquids.

A further object is the provision of a tissue-holder receptacle which facilitates the handling of the tissue by the pathologist or the technician in the laboratory.

A yet further object is generally to provide a tissue-holder receptacle which is inexpensive and at the same time superior in many respects to known tissue-holder receptacles.

The above objects of the invention and other objects ancillary thereto will be fully understood from the following description considered in connection with the accompanying drawings, which are to be considered as illustrative of the invention but not in limitation thereof.

In the drawings:

Fig. 1 is a vertical sectional view, partly in elevation, illustrating part of an automatic immersion apparatus for practising the present invention;

Fig. 2 is a horizontal sectional view, on a larger scale, taken on line 2—2 of Fig. 1, the top part of one of the material holders being cut away for illustrative purposes;

Fig. 3 is a vertical sectional view taken on the line 3—3 of Fig. 2;

Fig. 4 is a perspective view of one of the material holders, its cover being removed;

Fig. 5 is a perspective view of the cover for the material holder;

Fig. 6 is a side view of two tissue holders, illustrating a modification;

Figure 7:
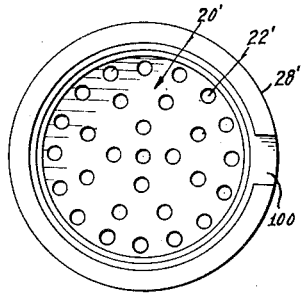
Fig. 7 is a plan view of the presently preferred form of material holder, its cover being removed.
Figure 8:
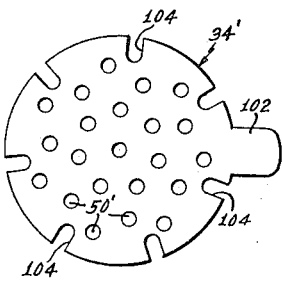
Fig. 8 is a plan view of the presently preferred form of cover for the material holder illustrated in Fig. 6.
Figure 9:
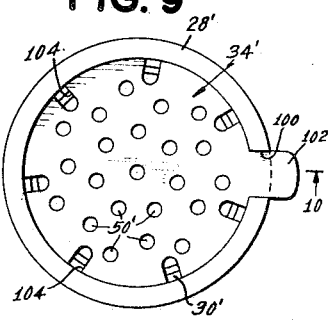
Fig. 9 is a plan view of the material holder shown in Fig. 7 being covered by the cover shown in Fig. 8.
Figure 10:
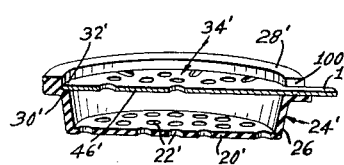
Fig. 10 is a sectional perspective view taken along the line 10—10 of Fig. 9.
Figure 11:
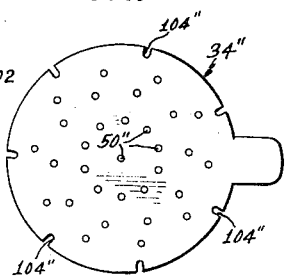
Fig. 11 is a plan view of another form of cover for the receptacle shown in Fig. 7, said cover being especially suitable when small tissue specimens are being processed.
Figure 12:
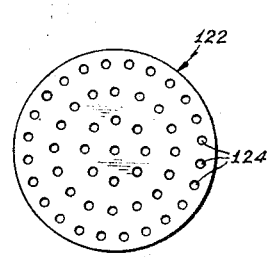
Fig. 12 is a plan view of a perforated liner for a tissue holder.

Referring first to Fig. 1, a plurality of material holders 10 are shown immersed in a beaker or other liquid receptacle 12. Holders 10 are carried by the novel carrier 14 which is more specifically described and claimed in the co-pending application of Edwin C. Weiskopf and Andres Ferrari, Jr., Serial No. 423,187, owned by the assignee of this application. Carrier 14 and receptacles 12 are well adapted for use with automatic immersion apparatus 16, of the type shown in the aforesaid Kling patent and in the other aforementioned patents and patent application, Serial No. 358,182.

Pursuant to the present invention provision is made in the tissue-holder receptacle for automatically holding the tissue specimen in flat condition so that it will not curl up or become distorted, and this result is accomplished by making the cover, in whole or in part, of the receptacle of a material to which the tissue specimen will self-adhere so that the tissue will stay flat while it is processed in the various liquid agents.

Referring now to Figs. 2 to 5 in detail, which illustrate one mode of practicing the invention, the body portion of the tissue holder receptacle is preferably non-metallic and can be formed, for example and not by way of limitation, of a plastic or of papier-mache, pressed paper, etc., and is generally cup-shaped having a bottom 20, provided with a plurality of apertures 22 to provide access of the liquid to the tissue when the receptacles are immersed in the liquids in the beakers 12, and a peripheral side wall 24. Said side wall 24 includes a lower or main portion 26 and an integral upper portion 28 which is outwardly offset to provide a shoulder 30 as best illustrated in Fig. 3. The upper portion 28 is provided with an internal peripheral groove 32 adjacent shoulder 30 for inserting the peripheral marginal edge of a cover 34.

In accordance with this invention, the tissue is mounted on the inner side of the cover 34, as indicated at T in Fig. 3, which shows a piece of the tissue mounted on the cover. In order to hold the tissue specimen in flat condition and prevent its curling up, or becoming distorted when treated by the fixative or other tissue processing liquids, said cover has an inner surface layer which is of such nature that the tissue will adhere to it, without the use of an extraneous adhesive, when placed in contact therewith. For this purpose the cover has an inner layer 46 formed of porous or absorptive material, such as for example the blotting surface layer of an ink blotter. The outer layer 48 of cover 34 may be relatively stiff and is preferably non-porous, such as, for example sized or calendered paper, so that the cover 34 will not readily disintegrate when wet. Portion 48 may be used as a label or to serve for identification purposes. The outer layer 48 may consist of paper which is similar to the smooth non-absorptive paper on the upper surface of a conventional ink blotter. Layers 46 and 48 are laminated and joined to each other in surface-to-surface relation by a glue which is preferably insoluble in or resistant to water and the agents in which the tissue is processed, such as for example a phenolic glue. The piece of tissue 49 is laid flat on portion 46 and automatically adheres to the surface thereof, the adhesion of the tissue 49 to portion 46 being aided by the albumin normally present in the tissue. Perforations 50 may be provided in cover 34 in order to augment access of the tissue processing liquids to the tissue. However, these may be omitted from the cover. Also if desired wall 24 may be perforated.

In use, the tissue specimen in its moist or in a moistened condition is placed on layer 46 and will adhere thereto. The adhesion is enhanced by the action of the fixative on the albumin inherently present in the tissue, as a result of which the albumin is coagulated by the formaldehyde fixative and there is a releasable bond between the tissue and the fibres of the porous material of layer 46. The fixative may be applied to the tissue specimen, for this purpose, as soon as the tissue is applied to the cover, or after the cover is placed on the body portion of the receptacle 10. Thereafter a plurality of the receptacles with similar cover-carrying tissue are mounted on the carrier 14, as described in the application filed concurrently herewith, or may be placed in a perforated basket, as described hereafter, and in the course of the operation of the apparatus the tissue will be acted upon by the various liquids in the several beakers. The first liquid is the fixative and this will ordinarily be sufficient to improve the securement of the tissue to the cover without a preliminary treatment of the tissue with the fixative when the tissue is first placed on the cover.

As illustrated in Fig. 6, the tissue-holder receptacles may have their lower peripheral edges corrugated as indicated at 52, for example, to prevent any possibility of the liquids in which the holders are immersed from not passing freely into and out of the holders through the bottom thereof when the holders are mounted one on top of the other as illustrated in Figs. 1 to 3. Ordinarily however, the failure of an adequate quantity of liquid to circulate freely into and out of the holders through the bottom openings is remote or negligible, especially so when the holders are used in processing machines of the type shown in the above mentioned co-pending application Serial No. 358,182 according to which the tissue holders are vertically reciprocated. The tissue-holder receptacles shown in Fig. 6 and designated 10a are the same in all respects as holders 10 described above.

It will be understood that when the tissue 49 is applied to the surface 46 of cover 34, and then immersed in each of the liquids including the paraffin baths, tissue specimens, such as pieces of intestines, tubes or any thin wall sections, or anything which is likely to curl up or become distorted after treatment by the fixative or the other tissue processing liquids, will hereafter when processed with the novel material holder 10 or 10a and cover 34 in accordance with the above technique as set forth in accordance with the present invention produce a substantially flat non-curled specimen. The tissue specimen processed in accordance with the present invention will be imbedded in the paraffin block in a substantially flat condition whereby truly representative sections of the tissue specimen can then be cut from said paraffin block, after which the tissue specimens can be deparaffinized, stained and mounted on slides.

As clearly illustrated in Fig. 4, the upper peripheral edge of the upper portion 28 of wall 24 has an ear or extension member 36 having a portion 38 provided with an aperture as at 40. Member 36 is provided with a score line at 42, whereby the portion 38 may be severed from portion 44 of flange member 36, the purpose of which will be hereinafter further explained.

It will be understood that the tissue processing machines have a plurality of receptacles arranged in a circular row on one or more horizontal supports, indicated herein at 62 and 64, and that the present drawings show only a part of a machine of the type shown by the above mentioned Kling patent and the co-pending application Serial No. 358,182, further illustration or description being unnecessary herein. However, it may be noted that in order to impart the various movements for processing the tissue specimens, such as the raising and lowering of the material holders 10 from the receptacles 12 containing the tissue processing liquids, and for imparting the vertical reciprocating movement to material holders 12, a conveyor 68 is provided. Said conveyor 68 includes the member or spider which is partially illustrated at 70, rods 71 and 72 suitably secured to spider 70 in any suitable manner. At the outer end thereof, each of the rods 71 and 72 is provided with a bracket or arm 74, 74 one end of which is provided with a sleeve 75 for securement to the free end of said rods. The carrier 14 is supported by a spindle 76 which has suitable provision for mounting on the other end of arm 74. Spindle 76 is mounted by means of member 78 which has an enlarged head. Mounted on the other end of spindle 76 is a channel shaped member 80 for carrying U-shaped member 82 of carrier 14, the leg portions of which are provided with pin projections 84, 84. The carrier 14 is shown immersed in upper receptacle 12 and includes the supporting spindle 86 which is connected to cross-bar 88, said cross-bar being apertured at either end for receiving the pin projections 84. Also mounted on spindle 76 is a cover 90 for receptacles 12. As set out in the previously noted co-pending application, Serial No. 423,187, said supporting spindle 86 comprises at least two portions in one modification, which can be readily disconnected from each other whereby to place material holders 10 and 10a thereon, after which said portions can again be connected whereby said material holders 10 or 10a when so placed on said supporting spindle 86 can be readily reciprocated within the liquids in said receptacles 12 and can also be readily moved from one receptacle to another.

As noted in Figs. 1 and 2, a plurality of the material holders 10 or 10a may be mounted on spindle 86, said material holders being mounted on said spindle by means of ear 36, and as noted previously, the lower portion of spindle 86 can be detached from the upper portion whereby the lower portion of spindle 86 can then be inserted through aperture 40, and then again attached to the upper portion of spindle 86, whereby the plurality of material holders 10 or 10a can be readily coupled to the carrier 14 for imparting to material holders 10 and 10a, the reciprocating movement required for the processing of the tissue specimen.

Pursuant to another feature of the present invention, material holders 10 or 10a may also be used with the basket type holder 92 by simply placing material holders 10 or 10a therein. As illustrated in Fig. 1, said basket type holder 92 is disposed within the lower receptacle 12, which is supported on the lower base 64. As illustrated in the aforesaid patents and as disclosed herein, said basket type holder 92 shown on the lower shelf 64, for illustrative purposes, is connected to and supported by the U-shaped member 82 by pins 84. As noted previously, flange 36 is provided with a score line at 42 whereby to sever portion 38 from 44. When material holders 10 or 10a are used with the basket type holder 92, there is no need for the portion 38, and therefore, portion 38 may be removed if desired.

In the aforesaid copending application, Serial No. 423,187, a material holder carrier mechanism is disclosed and claimed, wherein tracks are provided on the carrier 14 by modifying the spindle portion 86. Flange 36 of material holders 10 or 10a may also be modified in accordance with the aforesaid copending application so as to have provided a complementary portion for engagment with the tracks.

As noted in Figs. 1 and 3, the material holders 10 or 10a are shown in stacked relation; however, as a result of the reciprocating movement imparted to carrier 14 or the basket type carrier 92 by the immersion apparatus 16, said material holders 10 will ordinarily have relative movement imparted thereto, as previously explained. Portion 38 has an aperture 40 which is of a slightly larger diameter than the diameter of supporting spindle 86 whereby to allow the material holders 10 or 10a to move relative to each other. The tissue processing liquids can flow through the apertured base 20 through apertures 22 so as to infiltrate tissue specimen.

The presently preferred embodiment of this invention is illustrated in Figs. 7 to 16. Referring particularly to Figs. 7 to 10, the material holder is substantially the same as the material holder shown in Fig. 4 except that instead of a laterally extending portion 36 being provided on the receptacle body, it is provided as tab 102 on cover 34'. In order to seat cover 34' on shoulder 30' of the material holder, upper portion 28' of wall 24' is provided with a downwardly extending slot 100 which extends from the upper surface of upper portion 28' to shoulder 30'. When so seated tab 102 extends outwardly from the peripheral edge of upper portion 28' and thus provides an easy means for removing the cover by merely gripping the tab. Furthermore, tab 102 may be employed to carry suitable symbols identifying the material within the tissue holder. In addition, tab 102 can be employed similarly to flange member 36 on the receptacle body illustrated in Fig. 4 of the drawings, that is for mounting the material holder on a material holder carrier or support. This additional use of tab 102 is illustrated and claimed in U. S. patent application Serial No. 474,218, filed concurrently herewith by Edwin C. Weiskopf and Andres Ferrari, Jr., and assigned to the assignee of this application. To facilitate the positioning of cover 34' on shoulder 30' of the material holder shown in Figs. 7 to 10, cover 34' is provided with a plurality of radial slots 104 which increase the flexibility of the cover near the peripheral edge thereof.

Figure 13:
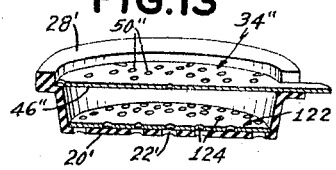
Fig. 13 is a sectional perspective view similar to Fig. 10 showing the material holder covered by the cover shown in Fig. 11 and lined with the liner illustrated in Fig. 12.

When very small tissue specimens, such as those taken in a biopsy, are carried by the tissue holder, there is a possibility of the tissue passing through the relatively large apertures in the receptacle body and in the cover therefor. To obviate this possibility, a special cover 34" (Fig. 11) having relatively small apertures 50" and relatively small radial slots 104" is provided to be used with the small tissue specimens. Furthermore, a paper disc or liner 122 (Fig. 12) having relatively small apertures 124 is provided. The liner is adapted to be positioned on the bottom of the receptacle body to reduce the size of the openings therein as shown in Fig. 13.

Figure 15:
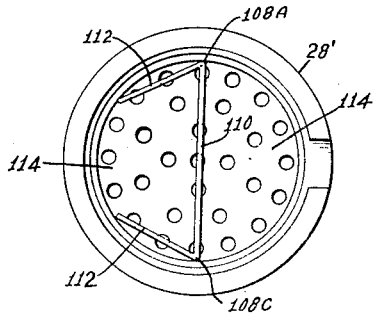
Fig. 15 is a plan view illustrating the foldable member shown in Fig. 14 dividing a material holder into two compartments.
Figure 14:
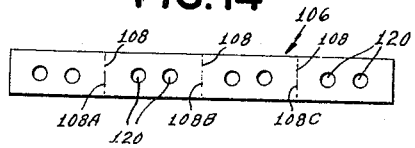
Fig. 14 is a plan view of a foldable member which is adapted to divide a tissue holder into a number of compartments.
Figure 16:
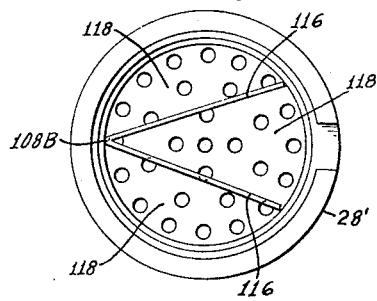
Fig. 16 is a plan view illustrating the foldable member shown in Fig. 14 dividing a material holder into three compartments.

Referring now to Figs. 14 to 16, another highly desirable feature of the present invention is illustrated. Since, very often, the tissue specimens to be treated in the processing liquids are relatively small as compared with the tissue holders described herein, it is possible to process several specimens in the same tissue holder. However, it is highly desirable and sometimes necessary to physically isolate one tissue specimen from the other in order to maintain proper identification of the specimens. To adapt the tissue holders described herein for carrying a plurality of physically isolated tissue specimens, a partitioning member 106 is provided. Member 106 may be made of any suitable material such as paper and is provided with a number of laterally extending scribed fold lines 108 here shown as three in number. For the convenience of explanation of the use of member 106, fold lines 108 are designated herein as 108A, 108B and 108C although it will be understood that the fold lines are all substantially the same. Member 106 is so proportioned and the fold lines 108 are so positioned on member 106 that when member 106 is folded along both fold lines 108A and 108C, as shown in Fig. 15, there is a relatively long portion 110 of member 106 and two relatively short portions 112 which are disposed at angles to portion 110. In such folded condition member 106 can be inserted into the main body portion of the tissue holder and thus divide the receptacle into two substantially equal tissue compartments 114. By means of member 106, it will be seen that the two tissue compartments 114 are substantially physically isolated from one another in order to prevent any co-mingling of the tissue specimens in either of the compartments. The scribed fold lines on member 106 are also arranged so that if the member is folded along fold line 108B so as to form two relatively equal portions 116, as shown in Fig. 16, member 106 can be inserted in the main body portion of the tissue holder and due to the inherent resiliency of the member 106, the member portions 116 dispose themselves at an angle to one another and thus divide the receptacle into three substantially equal compartments 118. Accordingly, it will be seen that one partitioning member 106 can be employed to divide the material holder into either two or three compartments as is desired by the pathologist or technician. Although it is desirable to physically isolate the tissue specimens in the several compartments in which member 106 divides the tissue holder, it is also desirable to provide for the passage of the processing liquid from one compartment to the other in order to provide a substantially larger amount of circulating liquid in the tissue holder so that the time of processing of the tissue will be reduced. In order to accomplish this, member 106 is provided with a plurality of apertures 120 which provide for the free passage of the liquid from compartment to compartment.

It is within the scope of this invention to employ the covers 34, 34' and 34" to mount the tissue specimens thereon without employing these covers in conjunction with the main body portions of the material holders. It is further within the scope of the present invention to place the tissue specimens in the main body part of the tissue holders and not mount them on the covers as hereinbefore described. If it is desired to so position the specimens, it is desirable to first immerse the tissue in any of a number of tissue fixatives well known to pathologists. With the specimens so treated, they will not adhere to any part of the material holders but merely rest on the bottoms thereof.

This application is a continuation-in-part of my earlier filed U. S. patent application, Serial No. 423,186, filed April 14, 1954, and assigned to the assignee hereof.

While I have shown and described the preferred embodiment of this invention and have further shown and described various modifications therein, other changes and modifications may be made therein within the scope of the appended claims without departing from the underlying idea or principles of this invention.

Having thus described my invention, what I claim and desire to secure by Letters Patent, is:

1. A tissue-holder receptacle for use in treating the tissue with a processing liquid in the preparation of the tissue for microscopic examination, comprising a container having an internal surface part formed of porous fibrous material for mounting the tissue thereon and a perforated surface part to provide for access of the processing liquid to said tissue, and a removable liner having perforations of smaller size than the perforations on said container surface part, said liner being positionable adjacent said perforated surface part for preventing small tissue specimens from passing out of said container through the perforations in said surface part.

2. A tissue-holder receptacle for use in treating the tissue with a processing liquid in the preparation of the tissue for microscopic examination, comprising a container having a body portion provided with perforations, the upper part of said body portion having an internal cover-seat, and a cover for the top of said container adapted to be releasably secured to said cover seat by pressing said cover downwardly thereon, said cover being provided with a plurality of radially extending slots to increase the flexibility thereof to facilitate the pressing of the cover on said cover seat, said cover being further provided with an internal porous fibrous surface part for mounting the tissue thereon in position for access thereto of the processing liquid.

3. A tissue-holder receptacle for use in treating the tissue with a processing liquid in the preparation of the tissue for microscopic examination, comprising a container having a body portion provided with perforations, the upper part of said body portion having an internal cover-seat, and a cover for the top of said container adapted to be releasably secured to said cover seat by pressing said cover downwardly thereon, said cover being provided with a plurality of radially extending slots to increase the flexibility thereof to facilitate the pressing of the cover on said cover seat.

4. A tissue-holder receptacle for use in treating the tissue with a processing liquid in the preparation of the tissue for microscopic examination, comprising a container having a perforated surface part providing for access of the processing liquid to said tissue and a member having a plurality of fold lines for folding it into at least two conditions, said member being insertable into said container when in said folded conditions, said member being adapted to divide said container into a number of container portions when in one folded condition and being further adapted to divide said container into another number of container portions in another of said folded conditions, whereby said container is adapted to mount a number of isolated tissue specimens corresponding to the number of container portions in which said container is divided by said member.

5. A tissue-holder receptacle for use in treating the tissue with a processing liquid in the preparation of the tissue for microscopic examination, comprising a container having a perforated surface part providing for access of the processing liquid to said tissue and a member having three fold lines thereon, said fold lines being so positioned on said member that when said member is folded along one of said fold lines said member takes the form of two arms disposed at an angle from each other so that when said member is inserted in said container in said folded condition said arms extend across said container to divide said container into three container portions adapted to mount three tissue specimens therein, and when said member is folded along the other two of said fold lines said member takes a form having two short arms and a long arm so that when said member is inserted into said container in said last mentioned folded condition, said short arms extend along the periphery of said container and said long arm extends across said container to divide the latter into two container portions adapted to contain two tissue specimens therein.

References Cited in the file of this patent

UNITED STATES PATENTS

| | | |
|---|---|---|
| 729,055 | Forger | May 26, 1903 |
| 1,236,832 | Frye | Aug. 14, 1917 |
| 2,302,698 | Kessel | Nov. 24, 1942 |
| 2,360,616 | Olsen | Oct. 17, 1944 |
| 2,369,592 | Marinsky et al. | Feb. 13, 1945 |
| 2,393,580 | Weiskopf | Jan. 22, 1946 |
| 2,539,802 | Weiskopf | Jan. 30, 1951 |
| 2,646,807 | Martin | July 28, 1953 |
| 2,783,180 | Whitehead | Feb. 26, 1957 |

OTHER REFERENCES

Kingzett: "Chemical Encyclopedia," page 220, Third Edition, Bailliere, Tindall and Cox, London, 1924.